United States Patent [19]

Barnsley

[11] Patent Number: 5,488,501
[45] Date of Patent: Jan. 30, 1996

[54] OPTICAL PROCESSING SYSTEM

[75] Inventor: Peter E. Barnsley, Suffolk, United Kingdom

[73] Assignee: British Telecommunications plc, London, England

[21] Appl. No.: 244,934

[22] PCT Filed: Apr. 8, 1993

[86] PCT No.: PCT/GB93/00747

§ 371 Date: Jun. 15, 1994

§ 102(e) Date: Jun. 15, 1994

[87] PCT Pub. No.: WO93/21706

PCT Pub. Date: Oct. 28, 1993

[30]    Foreign Application Priority Data

Apr. 9, 1992 [GB]   United Kingdom .................... 9207937
Dec. 9, 1992 [EP]   European Pat. Off. ............ 92311238.7

[51] Int. Cl.$^6$ .................................................. H04J 14/08
[52] U.S. Cl. ............................................. 359/137; 359/140
[58] Field of Search ........................... 359/113–115, 123, 359/125, 128, 137, 139–140, 152; 370/94.1, 94.2, 92

[56]    References Cited

U.S. PATENT DOCUMENTS 4,831,616   5/1989   Huber ..................................... 359/125

FOREIGN PATENT DOCUMENTS 0197263   2/1986   European Pat. Off. ..
0313388   10/1988  European Pat. Off. ..
0318332   11/1988  European Pat. Off. ..
0419720A1  9/1989  European Pat. Off. ..
0450524A3  3/1991  European Pat. Off. ..
WO91/01603 2/1991  WIPO .

OTHER PUBLICATIONS

Barnsley et al., "Wavelength Conversion from 1.3 to 1.55 μm Using Split contact Optical Amplifiers", IEEE Photonics Technology Letters, vol. 3, No. 3, 1 Mar. 1991, New York US, pp. 256–258.

Yamaguchi et al., "A Broadband Access Network Based on Optical Signal Processing: the Photonic Highway", Proceedings IEEE Infocom 1990, 3 Jun. 1990, San Drancisco (US), pp. 1030–1037.

Primary Examiner—Leo H. Boudreau
Assistant Examiner—Kinfe-Michael Negash
Attorney, Agent, or Firm—Nixon & Vanderhye

[57]    ABSTRACT

A telecommunications system comprising first and second nodes interconnected by a network transmission line. The first node comprises an optical data generator for producing an optical data signal at a first wavelength, an optical header generator for producing an optical control signal at a second wavelength, and means for multiplexing the data and control signals onto the transmission line. The second node comprises a switch and a controller responsive to signals at the second wavelength for controlling the routing of optical signals through the switch. A delay unit and associated control means are provided to ensure that sufficient delay occurs between the transmission start times of the control and data signals that the control signal completely overlaps the data signal at the second node.

24 Claims, 6 Drawing Sheets

OPTICAL PROCESSING SYSTEM

FIELD OF THE INVENTION

This invention relates to an optical processing system, and in particular to optical header recognition in packet switching networks.

In a circuit switched telecommunications network, a physical circuit is made between two terminals for the duration of a call. For certain traffic formats, such as speech, the information being transmitted never completely fills the connection between two terminals, that is to say the start of the information does not reach the destination terminal before the end of that information leaves the transmitting terminals, but the circuit is held open for the duration of the information's transmission between the two terminals. With high-speed circuits carrying digital data, a much greater resource utilisation is possible by sharing paths through the network. A packet switching network is one way of achieving this improved resource utilisation, data being transferred through the network in packets. Each packet includes, apart from the data itself, a header containing addressing and sequence (control) information for controlling the progress of that packet through the network. The addressing and sequence information coded in the header of a packet is decoded at the network nodes to provide routing control. A packet switching network thus provides a virtual circuit between two terminals, this circuit appearing to the users as a permanent connection between the terminals but which, in fact, is shared with other users.

BACKGROUND OF THE INVENTION

Known methods of coding packet headers rely on time correlation techniques. The utilisation of a packet switching network is linked to the bit-rate. The utilisation also depends upon the ratio of data time to wasted time, that is to say the ratio of the time the network is transmitting data to the time data is not being transmitted. In the time domain, the wasted time is made up of the time taken up with header transmission (the header of a packet occupying a separate time slot at the head of the data of that packet), and by the guard band transmission time, the guard band being the separation between adjacent packets which is essential to avoid overlap of the packets due to dispersion during transmission.

BRIEF DESCRIPTION OF THE INVENTION

The aim of the invention is to provide an alternative technique for coding and decoding header information, particularly in packet switching networks, which technique results in increased network utilisation.

The present invention provides a telecommunications system comprising first and second nodes interconnected by a network transmission line, the first node comprising an optical data generator for producing an optical data signal at a first wavelength, an optical header generator for producing an optical control (header) signal at a second wavelength, means for multiplexing the data and control signals onto the transmission line in such a manner that the duration of the control signal is at least equal to the duration of the data signal, a delay unit and control means associated with the delay unit for providing a sufficient delay between the transmission start times of the control and data signals to ensure that the control signal completely overlaps the data signal on arrival at the second node, the second node comprising a switch and a controller responsive to signals at the second wavelength for controlling the routing of optical signals through the switch.

As the control signal overlaps the data signal, the two signals occupy the same time slot.

Advantageously, the optical data generator produces optical data signals in packets, and preferably the optical data generator is constituted by a laser and a modulator for modulating the output of the laser. The header generator may also be constituted by a laser.

The system may further comprise a modulator for modulating the header laser so as to turn the header laser on at, or just before, the start of a data packet and to turn the header laser off at, or just after, the end of a data packet.

Conveniently, the controller of the second node includes a splitter for demultiplexing a portion of the control signal, and a narrow band-pass filter whose pass band is centred on the second wavelength, the output of the filter being used to control the operation of the switch. An amplifier may be positioned between the splitter and the filter.

Advantageously, the switch is an optical switch such as a NLOA. Alternatively, the switch is an opto-electronic switch. In either case, the switch may have two outputs, one of which leads to a further network transmission line, and the other of which leads to a receiver. Preferably, a narrow band-pass filter is positioned between the switch and the receiver, the pass band of said filter being centred on the first wavelength.

Preferably, there is a plurality of second nodes, the nodes being interconnected by network transmission lines, and the optical data generator and the optical header generator of the first node are tunable so as to provide data and control signals at predetermined, different wavelengths for each of the second nodes.

In a preferred embodiment, the or each second node is provided with a module for injecting data and control signals onto a transmission line. Advantageously, the or each module comprises an optical data generator for producing an optical data signal at a first predetermined wavelength, an optical header generator for producing an optical control signal at a second predetermined wavelength, and means for multiplexing said data and control signals onto a transmission line.

Preferably, the or each module further comprises a memory store for storing data awaiting transmission, and control means and look-up tables for determining the first and second predetermined wavelengths appropriate to the required destination of the signals being injected.

Advantageously, the optical data generator, the optical header generator and the multiplexing means of the first node are incorporated into a module, said module further comprising a memory store for storing data waiting transmission, control means and look=up tables for determining the wavelengths of the control and data signals appropriate to the destination node of the signals being injected. In this case, the first node may include a switch and a controller responsive to signals at a predetermined wavelength for controlling the routing of optical signals through the switch, said controller including a splitter for demultiplexing a portion of an incoming control signal and a narrow band-pass filter whose pass band is centred on said predetermined wavelength, the output of the filter being used to control the operation of the switch.

A respective delay unit may be associated with the control means and the look-up tables of each module for providing a sufficient delay between the transmission start times of the control and data signals to ensure that the control signal completely overlaps the data signal on arrival at a destination node.

Advantageously, the modules are provided with additional control means for adjusting the look-up tables to compensate for changes in the effective optical path length of inter-node network transmission lines. Preferably, the additional control means of each module is constituted by first and second processing means, the first processing means being effective to monitor incoming control signals and to feed back optical path length information derived therefrom to the node transmitting said control signals, and the second processing means being associated with the look-up tables of that module to up-date said look-up tables in dependence upon optical path length information received from the first processing means of another module. Conveniently, the first processing means of each module is a local processor associated with the control means of that module, and the second processing means is constituted by local processors associated with the look-up tables of that module. The system may further comprise a management centre for controlling the local processors.

DESCRIPTION OF THE DRAWINGS

The invention will now be described in greater detail, by way of example, with reference to the accompanying drawings, in which.

DESCRIPTION OF EXEMPLARY EMBODIMENTS

Figure 1:
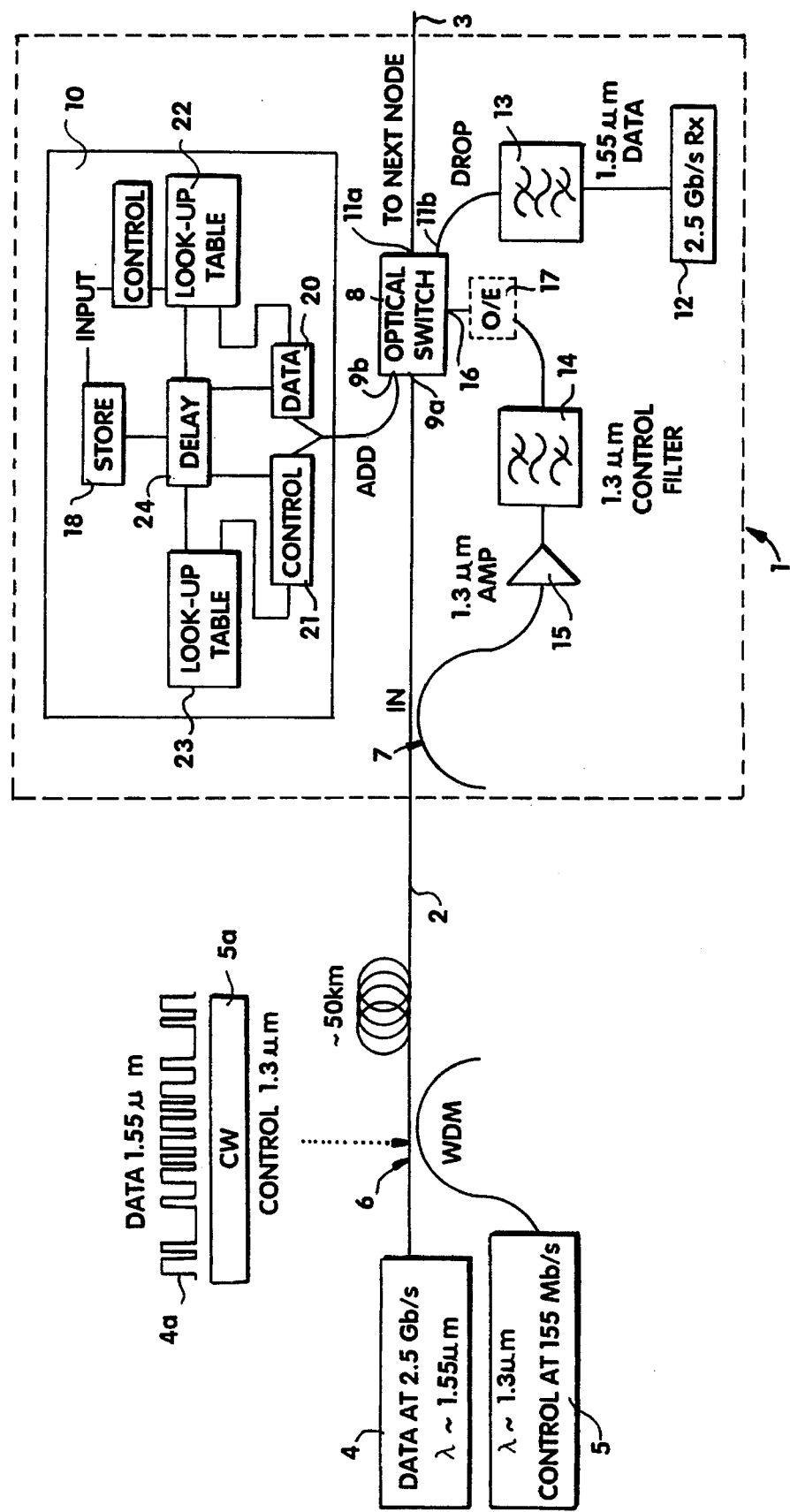
FIG. 1 is a schematic representation of a wavelength header coding/decoding apparatus constructed in accordance with the invention.

Referring to the drawings, FIG. 1 shows one node 1 of a packet switching optical fibre network, the network including a plurality of similar nodes. The node 1 is connected to the network via input and output fibres 2 and 3 respectively. The input fibre 2 is connected to a head-end station (not shown in detail) provided with an optical data generator 4 and a header generator 5. The optical data generator 4 produces data packets of 16-bit length (one of which is shown at 4a) by modulating a laser (not shown) at 2.5 Gbit/sec and at a wavelength of 1.55 μm. The header generator 5 produces header (control) signals (one of which is shown at 5a) by modulating a second laser (not shown) at an effective rate of 155 Mbit/sec corresponding to data packets of 16-bit length, and at a wavelength of, for example, 1.3 μm. This modulation is chosen so that the laser of the header generator 5 is turned on at, or just before, the start of a data packet 4a, off at, or just after, the end of that data packet. The control signal wavelength is chosen to match the receive wavelength of the node 1, and the header generator 5 is tunable so as to provide control signals at different wavelengths, each of which matches the receive wavelength of another network node. The two signals 4a and 5a are superimposed onto the fibre 2 by means of a WDM coupler 6.

The node 1 includes a four-port optical switch 8 for adding data to, and dropping data from, the network. The switch 8 has first and second input ports 9a and 9b respectively, the first input port being connected to the input fibre 2 via a splitter 7, and the second input port being connected to a data add module 10 (to be described in greater detail below). The switch 8 has first and second output ports 11a and 11b respectively, the first output port being connected to the output fibre 3, and the second output port being connected to a 2.5 Gbit/sec receiver 12 via a band-pass filter 13.

The splitter 7 demultiplexes a small proportion (typically a few percent) of the control signal 5a of an incoming packet, and feeds this tapped signal to a band-pass filter 14 via a 1.3 μm optical amplifier 15. The filter 14 has a narrow pass band centred on 1.3 μm, so that it will pass the tapped signal provided the wavelength of the tapped signal matches that of the pass band of the filter. The output of the filter 14 is fed to a control port 16 of the optical switch 8, thereby to open the switch and connect the first input port 9a to the second output port 11b. In this way, a data packet intended for the node 1 is dropped to its receiver 12. As the control signal 5a overlaps the data signal 4a in the packet, the switch 8 is opened at, or just before, the start of the data reaches the switch and is closed at, or just after, the end of the data leaves the switch. Thus the control signal applied to the control port 16 has at least the same time duration as the data packet. The filter 13 has a narrow pass band centred on a wavelength of 1.55 μm (the data wavelength), so that the signal reaching the receiver 12 is solely a data signal. The filter 13 not only filters out the remaining control signal 5a, it also filters out noise. If the wavelength of the tapped signal does not match that of the pass band of the filter 14, the filter has no output signal and the optical switch 8 remains closed, that is to say its first input port 9a is connected to its first output port 11a. In this way, the data/control packet associated with the tapped signal is routed through the node 1 to the output fibre 3 and on into the network.

The switch 8 is preferably an all-optical switch such as a non-linear optical amplifier (NLOA). Alternatively, the switch could be an opto-electronic device such as a lithium niobate switch, in which case an opto-electronic converter 17 (shown in dashed lines) would be included in the path between the filter 14 and the control port 16 of the switch 8. The converter 17 would not require any processing capabilities, but would need to carry out a certain amount of amplification to ensure that a sufficiently large electronic signal is input to control the switch 8. Simple opto-electronic components of this type are readily available; and, combined with known switching technology, can produce switch rise and fall times of much less than 1 ns.

The module 10 of the node 1 can add data packets onto the network when either a packet has been dropped by the node (having been triggered by the header address decoder described above), or if some protocol (such as a token-ring type protocol) allows input onto an empty line whilst ensuring controlled and fair network access. Data packets for transmission in this way are held in a memory store 18 provided in the module 10. The module 10 also includes an optical header generator 21 and a data generator 20. The generators 20 and 21 are tunable so as to transmit data at any one of a plurality of predetermined wavelengths, and to transmit control signals at any one of a plurality of different wavelengths. Respective look-up tables 22 and 23 are associated with the data and header generators 20 and 21 respectively, so that the wavelengths of both the data and the control signals for the required destination of a given packet are correctly provided. If dispersion is a potential problem, the look-up tables 22 and 23 can work out the difference between the transmission times of the control signal and the data signal so chosen, and can instruct a delay unit 24 to provide an appropriate delay between the transmission start times of the control and data signals, thereby to ensure that the control signal 5a completely overlaps the data signal 4a at the destination node, thereby ensuring that its optical switch 8 routes the whole of the data signal and does not lose any data bits. The loss of data bits would cause errors, and thereby detract from the operational characteristics of the network.

The head-end station also includes a memory store, look-up tables and a delay unit (similar to the items 18, 22, 23 and 24 of the module 10), so that data for transmission can be held awaiting transmission, the data and header wavelengths for transmission to any given node of the network can be worked out, and an appropriate delay can be provided in the transmission store times in the header and data signals for reducing dispersion problems. Indeed, the head-end station may include a data add module of the same type as that provided at the node 1. It would also be possible to provide the node 1 (and any other similar node connected to the network) with a tunable filters 13 and 14 so that the wavelengths of the control and data signals appropriate to each of the nodes can be altered, for example by a management centre, if required. In this case, it would be possible for the head-end station to be identical to each of the nodes 1 in the network.

Because of changes in the effective optical path length of network links caused by environmental alterations, such as temperature, the delay between any pair of nodes alters. This alteration could result in loss of information at the destination node 1, due to the control signal 5a moving with respect to the data signal 4a. This change in optical path length will probably only occur on time scales no greater than the kHz level. In order to ensure that all the optical path lengths are known and that the network remains "synchronized" (that is to say the control signals 5a overlap the data signals 4a at all the nodes 1), feedback information between the nodes is needed to monitor optical path lengths, and to adjust the look-up tables 22 and 23 accordingly. This feedback signal can be achieved by monitoring the arrival of the control signals 5a at the nodes 1. Thus, if the network knows where the information has come from (by monitoring the fibre that the signal arrived on), and monitors the relative time that a given control signal 5a is incident on the node, then any differences in path delay can be monitored. As shown in FIG. 1, this monitoring can be achieved by providing the look-up tables 22 and 23 of each node 1 with local processors 22a and 23a, and by tapping off a small percentage of the output signal of the filter 14 of each node 1 to a further local processor 14a. The processor 14a of a destination node 1 determines what has happened to the network, and sends a suitable update control signal through the network to all the other nodes to tell them how to update their look-up tables 22 and 23. These update signals may go via a central management centre (not shown) provided at the head-end station, or via some other management centre, perhaps linking a sub-set of the nodes 1. The need to provide a management centre depends on whether the total processing time of the local processors 22a, 23a and 14a is sufficient to make sure that the network stays "stable", and that the update control signals do not cause problems by changing the network after it has naturally recovered to its normal state (or it is still responding to previous signals). In other words, the time taken to adjust the network should be at most equal to the time-constants of the perturbing effects.

The local processors 22a and 22a in each of the transmission nodes 1 receive update control information from every other node in the network, and process this to modify their associated look-up tables 22 and 23 correctly. Thus, the look-up tables 22 and 23 of all the nodes 1 (including the head-end station) are continually up-dated to compensate for environmental alterations. The degree of intelligence that the local management processors 22a and 23a have will dictate the strategy for the look-up table upgrade. Thus, it would be ideal if the processors 22a and 23a look at a number of inter=dependent signals to work out the best solution for the network as a whole, covering all the links that the information traverses on its way to a given destination. The capability needed is, therefore, related to the number of nodes 1 in the network.

Figure 2:
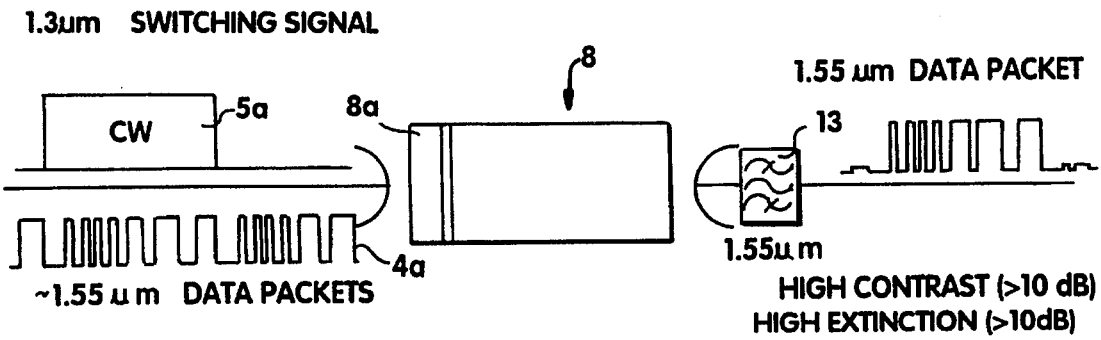
FIG. 2 is a schematic representation of one form of optical switch which could be used in the apparatus of FIG. 1.

The viability of the coding/decoding apparatus (and in particular the viability of using an NLOA as the optical switch 8) described above with reference to FIG. 1 has been tested experimentally using the configuration shown in FIG. 2. A data signal 4a at a wavelength of about 1.55 µm (1.535 µm to 1.56 µm operational range) was modulated at 1 Gb/s to 2.5 Gb/s. The control signal 5a was a 1.31 µm DFB laser modulated with 1010 pattern at ¹⁄₁₆th the bit-rate of the data. These signals 4a, 5a were injected into the absorber facet 8a of a bulk material NLOA 8 which was under standard bias conditions. Improved performance occurred when the absorber bias was reduced. The output from the NLOA 8 was filtered using a band-pass filter 13 at the data wavelength. Typical gated data signals are shown in FIGS. 3a to 3d. These results are for 1 Gb/s data, but identical behaviour was observed at speeds of 2.5 Gb/s. NLOAs operating at >5 Gb/s have been demonstrated, and further speed improvements are expected with device optimisation.

Figure 3B:
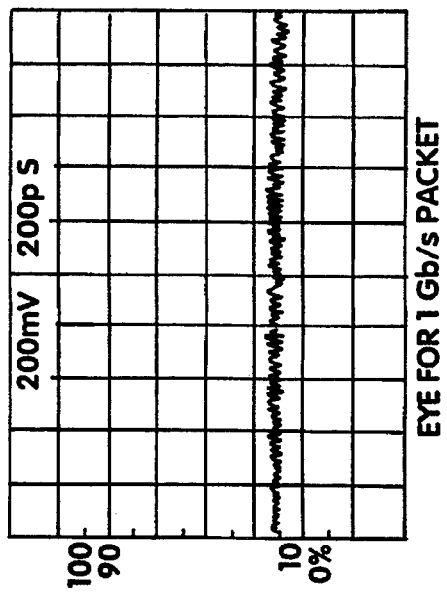
FIGS. 3a to 3d illustrate the output signal behaviour of the optical switch of FIG. 2.
Figure 3D:
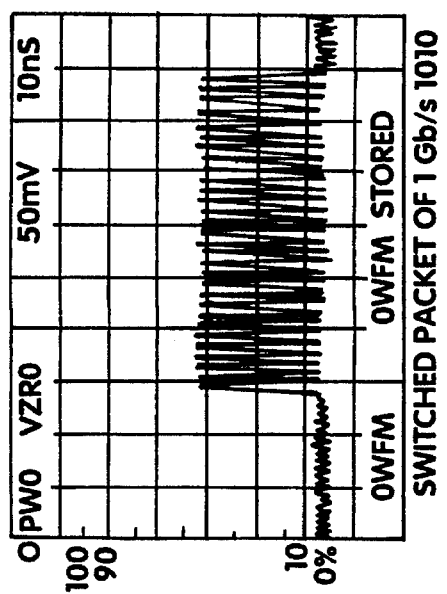
Figure 3A:
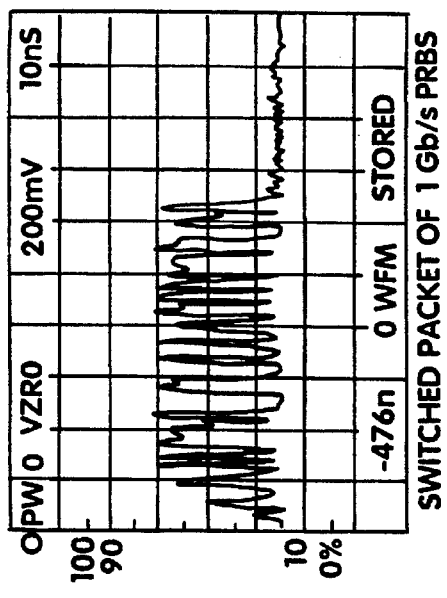
Figure 3C:
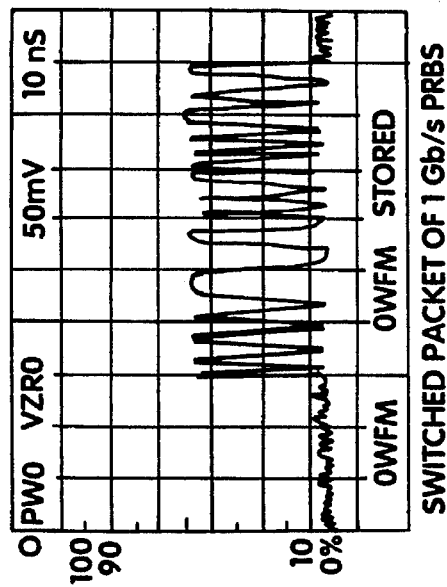

Operation in two modes (resonant amplifier and injection locked) has been demonstrated. The resonant amplifier mode results are shown in FIGS. 3a and 3b, while those for the injection locked case are shown in FIGS. 3c and 3d. The measured extinction ratio for both cases was >13 dB between the gated data and the rejected data signals, and the EYE diagram shows a clean opening and good error-ratio performance is expected. The contrast ratio (the on-level power relative to the off-level power referenced to 0) was >10 dB. The rise and fall of the gate for the resonant amplifier case was ~2–5 ns, and dependent on the detuning of the data wavelength from the NLOA Fabry-Perot mode. A detuning range of ~10 GHz was possible which would require wavelength referencing in a network configuration to ensure good performance.

In the injection locked mode (NLOA almost or at threshold), the rise and fall times were less than a bit-period (400 ps), but the network benefits of this faster gating time are balanced by a much tighter detuning requirement, with successful operation obtainable over a data wavelength range of approximately 1–2 GHz.

The technique described above can be used in packet, virtual and circuit systems. It maintains a transparent data channel, and puts the necessary bit-rate specific information (such as packet duration, required rise and fall times etc) into a control channel at a different wavelength. The principle of the invention could also be used in "frame" systems, such as synchronised digital hierarchy (SDH) where the data bit-rate is set, and to fast circuit switched networks. The technique could also be used for distribution applications for data communications networks in LAN, MAN and WAN environments, and the general principle may also be used in trunk applications if configured correctly.

Figure 4:
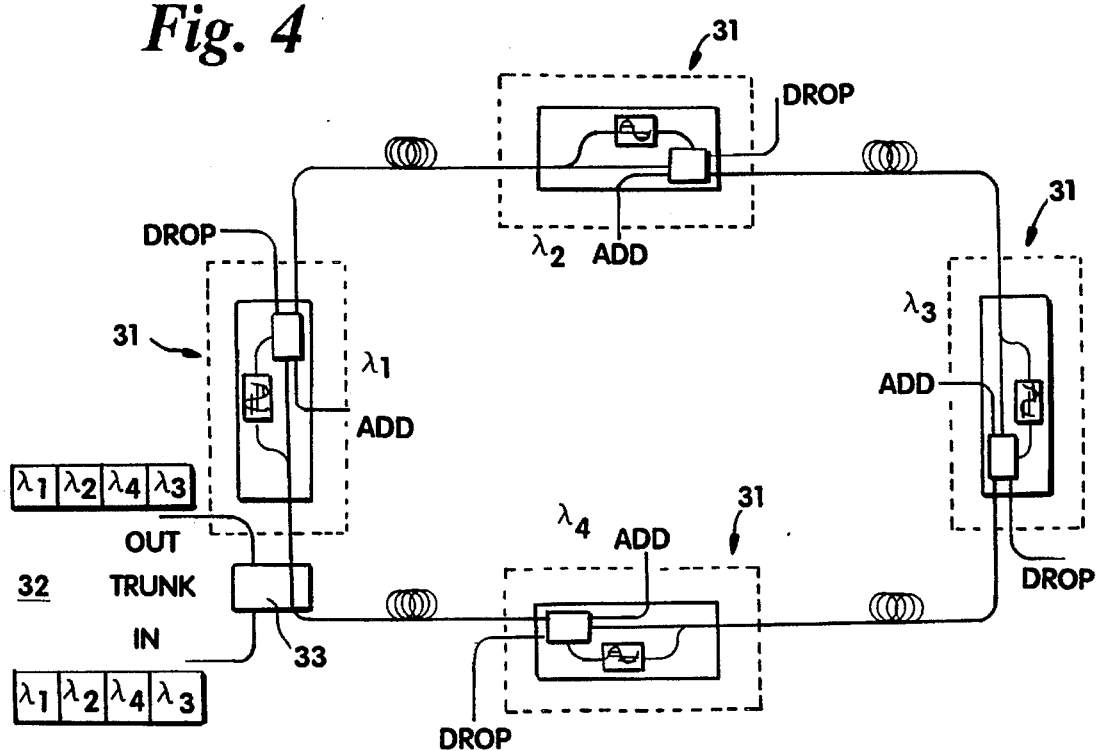
FIG. 4 is a schematic representation of a simple ring network incorporating apparatus of the type shown in FIG. 1.

The technique can be used in ring, start and star/ring topologies as described below with references to FIGS. 4 to 6. Thus, FIG. 4 shows one possible configuration for using the wavelength header coding/decoding technique of the invention in a simple ring network. This network includes four nodes 31, each of which is similar to the node 1 of FIG. 1. The nodes 31 are connected in a ring configuration at the end of a trunk spur 32. Each of the nodes 31 has a different address wavelength $\lambda_1$, $\lambda_2$, $\lambda_3$ and $\lambda_4$ which matches the control signal wavelengths input by the trunk spur 32. Obviously, therefore, the filters 14 of the nodes 31 are different, each having a narrow pass band centred on the appropriate address wavelength $\lambda_1$, $\lambda_2$, $\lambda_3$ or $\lambda_4$.

Data from the network enters the ring via the trunk spur 32 and a trunk multiplexer (such as a 3 dB coupler) 33, and travels around the ring reaching each of the nodes 31 in turn. At each node 31, the information on the line is interrogated and, when the control signal 5a of any given packet matches the address wavelength of a node, the data is routed off the ring, and local data ready for transmission into the network can be added in its place. As with the embodiment of FIG. 1, there is an add/drop function at the wavelengths of both data and control signals. Data circulating in the ring is multiplexed back onto the trunk spur 32 after travelling completely around the ring. This type of configuration could, therefore, be useful for signalling networks with the transfer of control information between nodes.

Information entering and leaving the ring does not necessarily need to be at the same wavelength or bit-rate if the trunk multiplexers are designed correctly. For example, if the trunk network is a wavelength routed network (at the data wavelength) then outward information can be transmitted at any of the available network wavelengths. The control signal wavelengths can, therefore, also be any convenient value. Although FIG. 4 shows only four nodes 31 on the ring, it will be apparent that the principle can be extended to virtually any number of nodes, this number being dictated by factors such as the control wavelength range, the filter bandwidth, the pass bandwidth of the wavelength-routed cross-connects elsewhere in the network, and any dispersion problems. As mentioned above, each of the nodes 31 includes an amplifier for amplifying the tapped signal, so that a very low percentage of an input signal needs to be tapped, so that many nodes can be concatenated.

Figure 5:
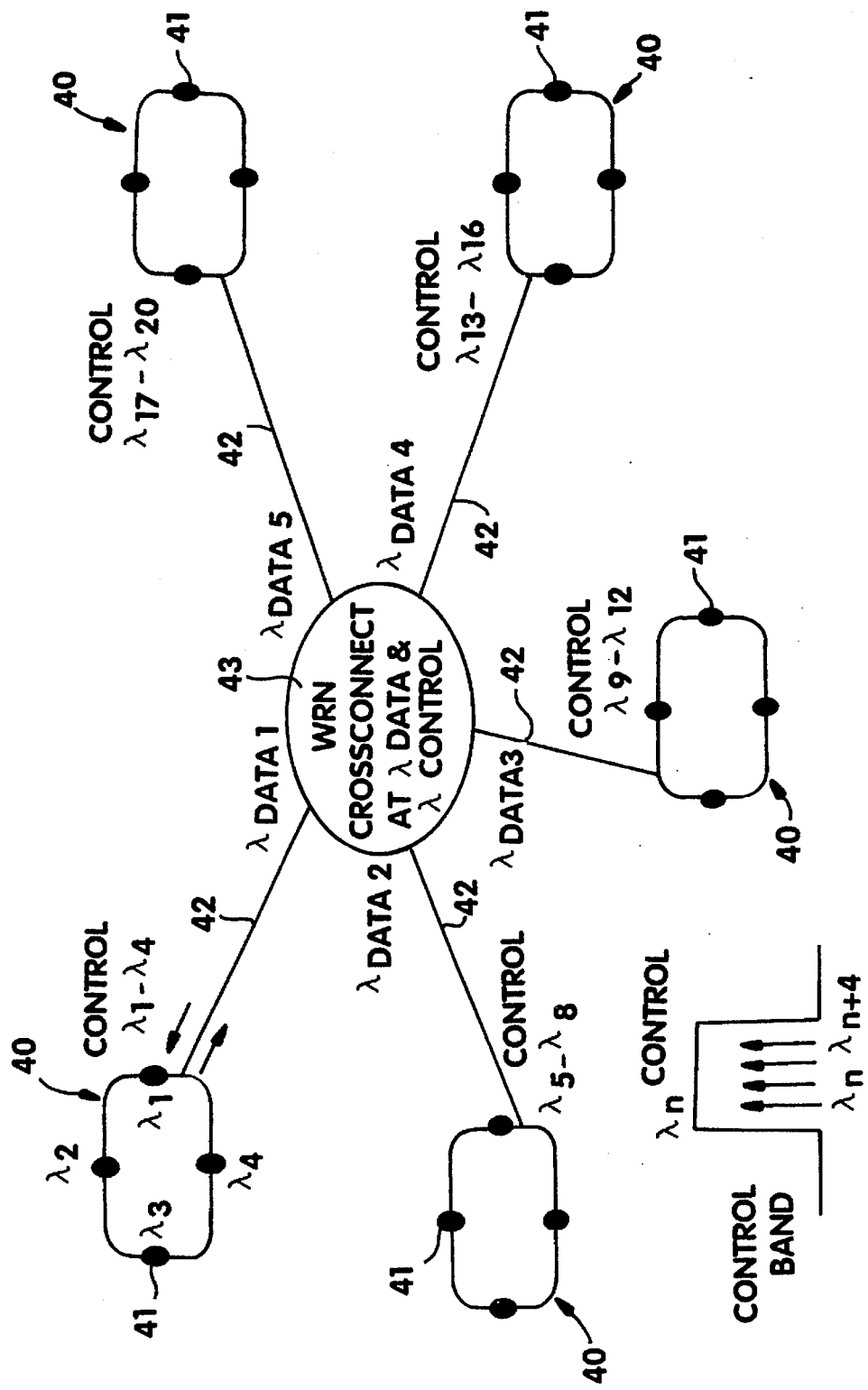
FIG. 5 is a schematic representation of a star network incorporating apparatus of the type shown in FIG. 1.

FIG. 5 shows a star topology network having five rings 40 each of which is similar to the ring described above with reference to FIG. 4. Each ring 40 includes four nodes 41, each of which is similar to the node 1 of FIG. 1. Each of the rings 40 is connected to a wavelength routed cross-connect 43 via a respective trunk spur 42. Each of the trunk spurs 42 is arranged to carry data at a respective data wavelength $\lambda_{data1}$, $\lambda_{data2}$, $\lambda_{data3}$, $\lambda_{data4}$ and $\lambda_{data\,5}$. Each of the nodes 41 of each ring 40 has different address wavelength $\lambda_1$ to $\lambda_{20}$ which matches the header wavelengths input by the trunk spurs 42. Here again, the filters 14 of the nodes 41 are different, each having a narrow pass band centred on the appropriate address wavelength $\lambda_1$ to $\lambda_{20}$.

Figure 7:
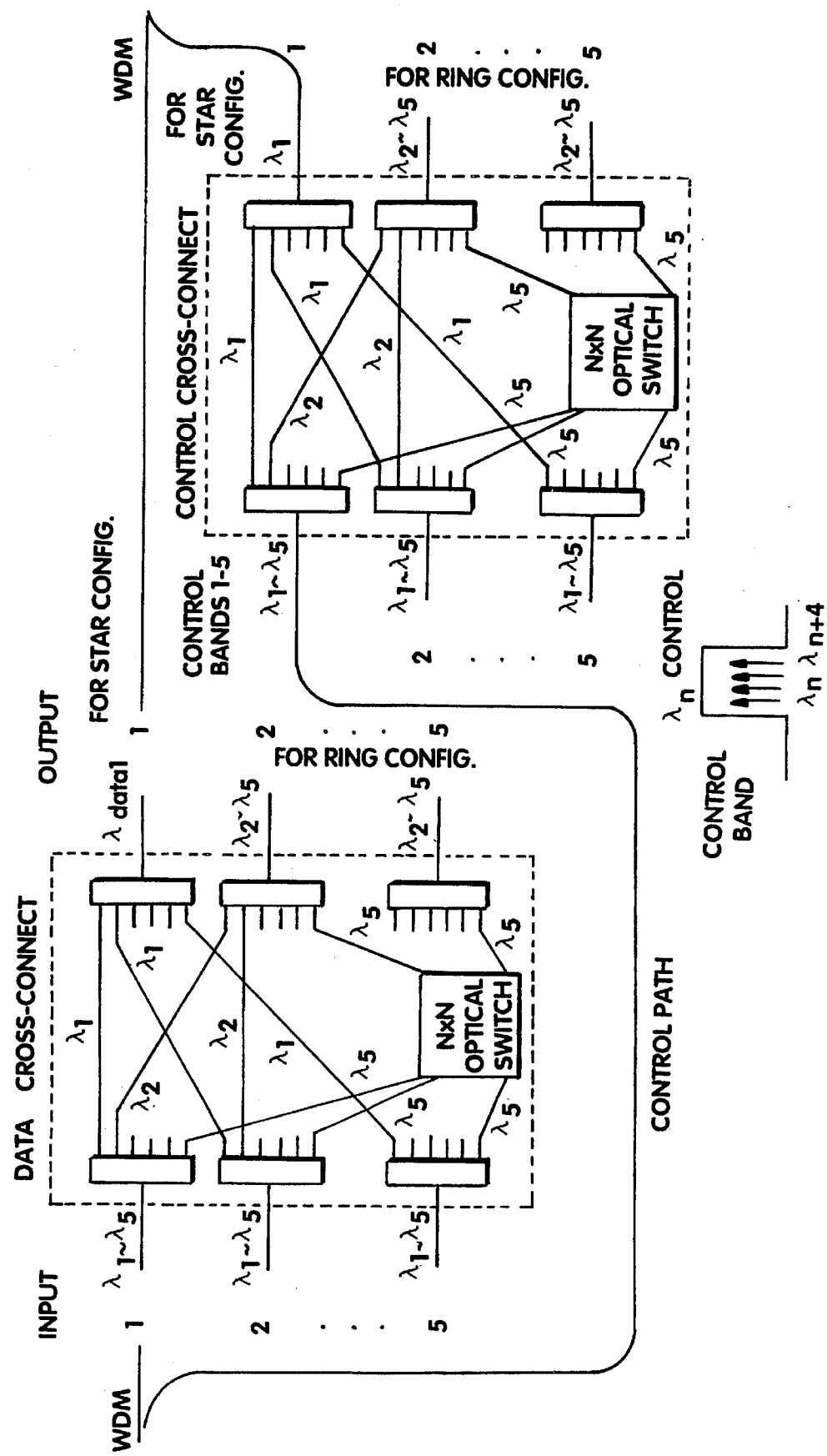
FIG. 7 is a schematic representation of a wavelength routing network crossconnect switch for use with the networks of FIGS. 5 and 6.

The wavelength routed cross-connect 43, which interconnects the five rings 40, ensures that the control signals are always routed over the same effective path as the associated data. This cross-connect 43 is shown in detail in FIG. 7, and has the same interconnections for both control and data fields, any switching within these fields being driven in synchronism. A node 41 that wants to transmit data to another node 41 within the network choses the correct data wavelength (for example $\lambda_{data1}$) and the correct control signal wavelength (for example $\lambda_2$). The cross-connect 43 is designed to route control signal bands rather than single wavelengths, that is to say a band of wavelengths $\lambda_1$ to $\lambda_4$ is routed rather than routing each of these wavelengths separately. This principle could also be used to route the data wavelengths, which would increase the capacity of the network.

Figure 6:
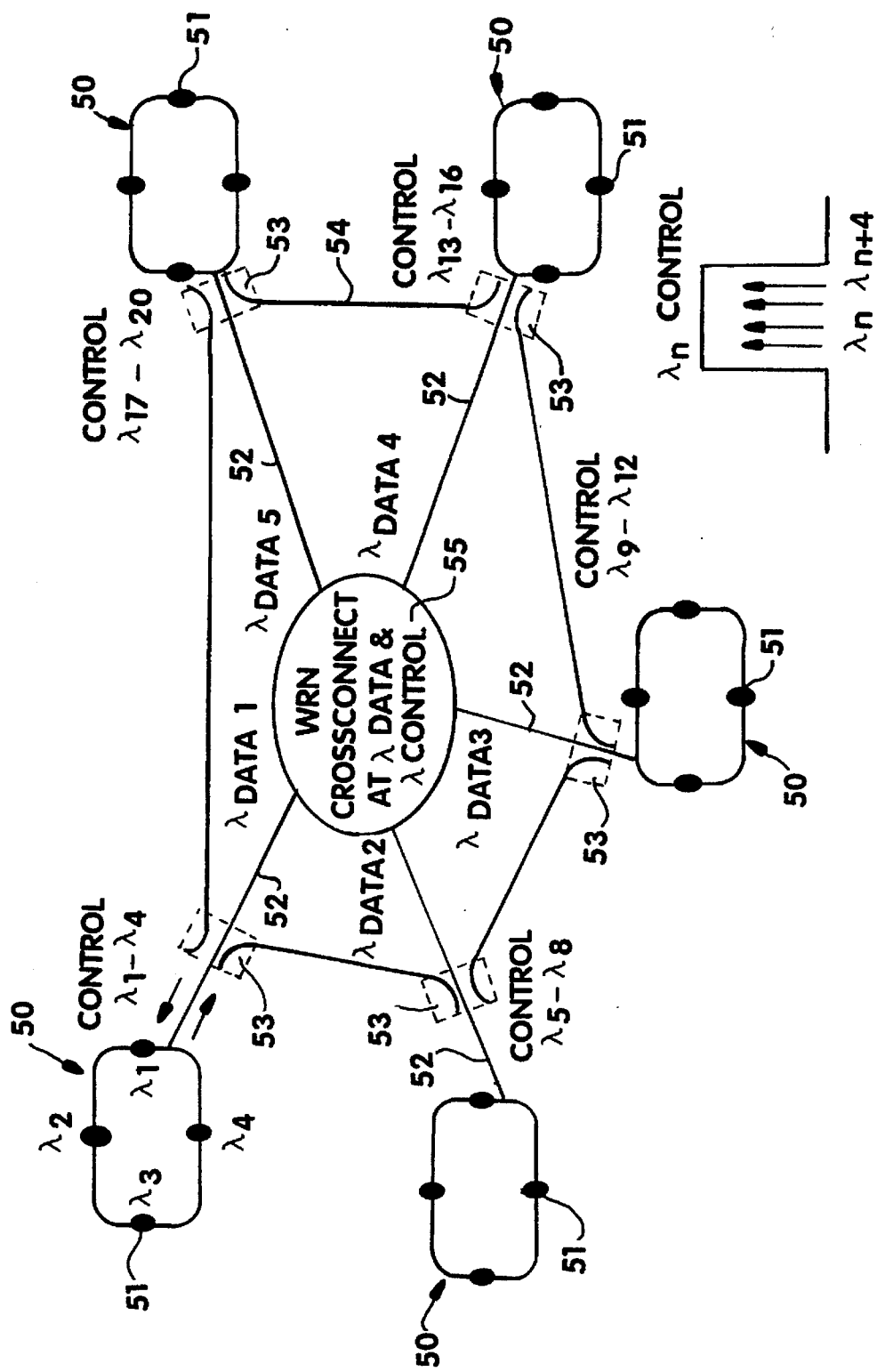
FIG. 6 is a schematic representation of a ring/star network incorporating apparatus of the type shown in FIG. 1.

FIG. 6 shows a star-ring topology having five rings 50, each of which includes four nodes 51, each being similar to the node 1 of FIG. 1. Each of the rings 50 is connected to an inner ring 54 via a respective trunk spur 52 and a wavelength routed cross-connect 53. The trunk spurs 52 also lead to a central wavelength routed cross-connect 55, and each is arranged to carry data at a respective data wavelength $\lambda_{data1}$ to $\lambda_{data5}$. Each of the nodes 51 of each ring 50 has a different address wavelength $\lambda_1$ to $\lambda_{20}$ which matches the control signal wavelengths input by the trunk spurs 52. Here again, the filters 14 of the nodes 51 are different, each having a narrow pass band centred on the appropriate address wavelength $\lambda_1$ to $\lambda_{20}$. The wavelength routed cross-connects 53 and 55 are similar to that shown in FIG. 7, and ensure that the control signals are always routed over the same effective path as the associated data.

Any switching that is required, for contention resolution or re-routing, at any of the cross-connects 43, 53 and 55 will require that an arriving control signal 5a completely overlaps in time its associated data signal 4a. This overlap need only occur within a given switching window. The control of the look-up tables 22 and 23 of the transmitting node will need to take this into account when setting up the transmission. The complexity of the network and the choice of wavelengths is, therefore, related. This is particularly the case where packets are routed through one or more cross-connects between a transmission node and a destination node, where it may be essential to ensure overlapping of control and data signals at the cross-connect(s)—although this may not be required if the cross-connects are such that the optical switch within the control cross-connect can operate non-synchronously with respect to the optical switch within the data cross-connect.

I claim:

1. A telecommunications system comprising first and second nodes interconnected by a network transmission line, the first node comprising an optical data generator for producing an optical data signal at a first wavelength, an optical header generator for producing an optical control signal at a second wavelength, means for multiplexing the data and control signals onto the transmission line in such a manner that the duration of the control signal is at least equal to the duration of the data signal, a delay unit coupled with the optical data generator and the optical header generator and control means coupled with the delay unit for providing a sufficient delay between the transmission start times of the controller and data signals to ensure that the control signal completely overlaps the data signal on arrival at the second node, the second node comprising a switch and a controller coupled to the transmission line, said controller being coupled to said switch and responsive to signals at the second wavelength for controlling the routing of optical signals through the switch.

2. A system as claimed in claim 1, wherein the optical data generator produces optical data signals in packets.

3. A system as claimed in claim 1, wherein the optical data generator is constituted by a laser and a modulator for modulating the output of the laser.

4. A system as claimed in claim 1, wherein the header generator is constituted by a laser.

5. A system as claimed in claim 4, further comprising a modulator for modulating the header laser so as to turn the header laser on at, or just before, the start of a data packet and to turn the header laser off at, or just after, the end of a data packet.

6. A system as claimed in claim 1, wherein the controller of the second node includes a splitter for demultiplexing a portion of the control signal and a narrow band-pass filter whose pass band is centred on the second wavelength, the output of the filter being used to control the operation of the switch.

7. A system as claimed in claim 6, further comprising an amplifier positioned between the splitter and the filter.

8. A system as claimed in claim 1, wherein the switch is an optical switch.

9. A switch as claimed in claim 8, wherein the optical switch is a NLOA.

10. A system as claimed in claim 1, wherein the switch is an opto-electronic switch.

11. A system as claimed in claim 1, wherein the switch has two outputs, one of which leads to a further network transmission line, and the other of which leads to a receiver.

12. A system as claimed in claim 11, further comprising a narrow band-pass filter positioned between the switch and the receiver, the pass band of said filter being centred on the first wavelength.

13. A system as claimed in claim 1, wherein there is a plurality of second nodes, the nodes being interconnected by network transmission lines, and the optical data generator and the optical header generator of the first node are tunable so as to provide data and control signals at predetermined, different wavelengths for each of the second nodes.

14. A system as claimed in claim 1, wherein the or each second node is provided with a module for injecting data and control signals onto a transmission line.

15. A system as claimed in claim 14, wherein the or each module comprises an optical data generator for producing an optical data signal at a first predetermined wavelength, an optical header generator for producing an optical control signal at a second predetermined wavelength, and means for multiplexing said data and control signals onto a transmission line.

16. A system as claimed in claim 15, wherein the or each module further comprises a memory store for storing data awaiting transmission.

17. A system as claimed in claim 15, wherein the or each module further comprises control means and look-up tables for determining the first and second predetermined wavelengths appropriate to the required destination node of the signals being injected.

18. A system as claimed in claim 13, wherein the optical data generator, the optical header generator and the multiplexing means of the first node are incorporated into a module, said module further comprising a memory store for storing data waiting transmission, the control means and look-up tables for determining the wavelengths of the control and data signals appropriate to the destination node of the signals being injected.

19. A system as claimed in claim 18, wherein the first node includes a switch and a controller responsive to signals at a predetermined wavelength for controlling the routing of optical signals through the switch, said first node controller including a splitter for demultiplexing a portion of an incoming control signal and a narrow band-pass filter whose pass band is centred on said predetermined wavelength, the output of the filter being used to control the operation of the first node switch.

20. A system as claimed in claim 17, further comprising a respective delay unit associated with said control means and said look-up tables of each module for providing a sufficient delay between the transmission start times of the control and data signals to ensure that the control signal completely overlaps the data signal on arrival at the destination node.

21. A system as claimed in claim 18, wherein the modules are provided with additional control means for adjusting the look-up tables to compensate for changes in the effective optical path length of inter-node network transmission lines.

22. A system as claimed in claim 21, wherein the additional control means of each module is constituted by first and second processing means, the first processing means being effective to monitor incoming control signals and to feed back optical path length information derived therefrom to the node transmitting said control signals, and the second processing means being associated with the look-up tables of that module to up-date said look-up tables in dependence upon optical path length information received from the first processing means of another module.

23. A system as claimed in claim 22, wherein the first processing means of each module is a local processor associated with the control means of that module, and the second processing means is constituted by local processors associated with the look-up tables of that module.

24. A system as claimed in claim 23, further comprising a management centre for controlling the local processors.

* * * * *